(12) United States Patent
Buyukkokten et al.

(10) Patent No.: US 8,010,459 B2
(45) Date of Patent: Aug. 30, 2011

(54) METHODS AND SYSTEMS FOR RATING ASSOCIATED MEMBERS IN A SOCIAL NETWORK

(75) Inventors: Orkut Buyukkokten, Mountain View, CA (US); Adam Douglas Smith, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1225 days.

(21) Appl. No.: 10/928,653

(22) Filed: Aug. 26, 2004

(65) Prior Publication Data
US 2005/0159998 A1     Jul. 21, 2005

Related U.S. Application Data

(60) Provisional application No. 60/536,584, filed on Jan. 21, 2004.

(51) Int. Cl.
G06Q 10/00    (2006.01)
G06Q 30/00    (2006.01)

(52) U.S. Cl. ...................................... 705/319
(58) Field of Classification Search ........................ 705/1
See application file for complete search history.

(56) References Cited

U.S. PATENT DOCUMENTS

| | | | |
|---|---|---|---|
| 5,287,498 A | 2/1994 | Perelman et al. |
| 5,537,586 A | 7/1996 | Amram et al. |
| 5,796,393 A | 8/1998 | MacNaughton et al. |
| 5,950,200 A | 9/1999 | Sudai et al. |
| 5,963,951 A | 10/1999 | Collins |
| 6,041,311 A | 3/2000 | Chislenko et al. |
| 6,049,777 A | 4/2000 | Sheena et al. |
| 6,052,122 A | 4/2000 | Sutcliffe et al. |
| 6,061,681 A | 5/2000 | Collins |
| 6,073,105 A | 6/2000 | Sutcliffe et al. |
| 6,073,138 A | 6/2000 | de l'Etraz et al. |
| 6,092,049 A | 7/2000 | Chislenko et al. |
| 6,185,559 B1 | 2/2001 | Brin et al. |
| 6,256,648 B1 | 7/2001 | Hill et al. |

(Continued)

FOREIGN PATENT DOCUMENTS
CN    1949220 A    4/2007
(Continued)

OTHER PUBLICATIONS

Kamvar, Sepander D., et al. "The EigenTrust Algorithm for Reputation Management in P2P Networks." International World Wide Web Conference Proceedings of the 12th Proceedings of the 12th ICWWW 2003: The ACM Portal. Association for Computing Machinery. Jul. 2, 2008 <http://portal.acm.org/citation.cfm?id=775152.775242>.*

(Continued)

*Primary Examiner* — Jami A Plucinski
*Assistant Examiner* — Shaun Sensenig
(74) *Attorney, Agent, or Firm* — Fenwick & West LLP

(57) ABSTRACT

Systems and methods for rating associated members in a social network are set forth. According to one embodiment a method comprising outputting a ratings interface for rating at least one member of a social network associated with a user, wherein the rating interface provides the user with the ability to rate the member in one or more categories, receiving ratings for the member from the user, associating the ratings with the member, and connecting the ratings for the member with the user is set forth.

31 Claims, 4 Drawing Sheets

U.S. PATENT DOCUMENTS

| | | | |
|---|---|---|---|
| 6,285,999 | B1 | 9/2001 | Page |
| 6,327,590 | B1 | 12/2001 | Chidlovskii |
| 6,366,962 | B1 | 4/2002 | Teibel |
| 6,389,372 | B1* | 5/2002 | Glance et al. ................. 702/189 |
| 6,421,678 | B2 | 7/2002 | Smiga et al. |
| 6,442,567 | B1 | 8/2002 | Retallick et al. |
| 6,526,440 | B1 | 2/2003 | Bharat |
| 6,529,903 | B2 | 3/2003 | Smith et al. |
| 6,594,673 | B1 | 7/2003 | Smith et al. |
| 6,615,209 | B1 | 9/2003 | Gomes et al. |
| 6,658,423 | B1 | 12/2003 | Pugh et al. |
| 6,665,715 | B1 | 12/2003 | Houri |
| 6,678,681 | B1 | 1/2004 | Brin |
| 6,725,259 | B1 | 4/2004 | Bharat |
| 6,754,873 | B1 | 6/2004 | Law et al. |
| 6,799,176 | B1 | 9/2004 | Page |
| 6,834,195 | B2 | 12/2004 | Brandenberg et al. |
| 6,837,436 | B2 | 1/2005 | Swartz et al. |
| 6,865,546 | B1 | 3/2005 | Song |
| 6,871,186 | B1 | 3/2005 | Tuzhilin et al. |
| 6,895,406 | B2 | 5/2005 | Fables et al. |
| 6,912,505 | B2 | 6/2005 | Linden et al. |
| 7,013,292 | B1 | 3/2006 | Hsu et al. |
| 7,069,308 | B2 | 6/2006 | Abrams |
| 7,080,117 | B2 | 7/2006 | De Pinto et al. |
| 7,092,821 | B2 | 8/2006 | Mizrahi et al. |
| 7,113,917 | B2 | 9/2006 | Jacobi et al. |
| 7,117,254 | B2 | 10/2006 | Lunt et al. |
| 7,118,153 | B2 | 10/2006 | Lunt |
| 7,139,252 | B2 | 11/2006 | Babu et al. |
| 7,234,117 | B2 | 6/2007 | Zaner |
| 7,275,068 | B2 | 9/2007 | Huberman et al. |
| 7,318,037 | B2 | 1/2008 | Solari |
| 7,343,335 | B1 | 3/2008 | Olliphant |
| 7,383,258 | B2 | 6/2008 | Harik |
| 7,433,876 | B2 | 10/2008 | Spivack et al. |
| 7,472,110 | B2* | 12/2008 | Achlioptas ........................ 707/3 |
| 7,478,078 | B2 | 1/2009 | Lunt et al. |
| 7,539,697 | B1 | 5/2009 | Akella et al. |
| 2002/0023230 | A1 | 2/2002 | Bolnick |
| 2002/0042791 | A1 | 4/2002 | Smith et al. |
| 2002/0059201 | A1 | 5/2002 | Work |
| 2002/0103682 | A1 | 8/2002 | Stemmer et al. |
| 2002/0116466 | A1 | 8/2002 | Trevithick et al. |
| 2002/0123988 | A1 | 9/2002 | Dean et al. |
| 2002/0124053 | A1 | 9/2002 | Adams et al. |
| 2002/0133365 | A1* | 9/2002 | Grey et al. ........................ 705/1 |
| 2002/0133481 | A1 | 9/2002 | Smith et al. |
| 2002/0143944 | A1 | 10/2002 | Traversat |
| 2002/0169782 | A1* | 11/2002 | Lehmann et al. ............. 707/100 |
| 2002/0174073 | A1 | 11/2002 | Nordman et al. |
| 2002/0194112 | A1* | 12/2002 | dePinto et al. .................. 705/37 |
| 2003/0020977 | A1 | 1/2003 | Smith et al. |
| 2003/0050977 | A1 | 3/2003 | Puthenkulam et al. |
| 2003/0063072 | A1 | 4/2003 | Brandenberg et al. |
| 2003/0069749 | A1 | 4/2003 | Shear et al. |
| 2003/0083898 | A1 | 5/2003 | Wick et al. |
| 2003/0101227 | A1 | 5/2003 | Fink |
| 2003/0163530 | A1 | 8/2003 | Ribak |
| 2004/0041836 | A1 | 3/2004 | Zaner |
| 2004/0042599 | A1 | 3/2004 | Zaner et al. |
| 2004/0059708 | A1 | 3/2004 | Dean et al. |
| 2004/0088325 | A1 | 5/2004 | Elder et al. |
| 2004/0093224 | A1 | 5/2004 | Vanska |
| 2004/0093324 | A1 | 5/2004 | Marappan |
| 2004/0119740 | A1 | 6/2004 | Chang et al. |
| 2004/0122681 | A1* | 6/2004 | Ruvolo et al. ...................... 705/1 |
| 2004/0122803 | A1 | 6/2004 | Dom et al. |
| 2004/0122811 | A1 | 6/2004 | Page |
| 2004/0167794 | A1* | 8/2004 | Shostack et al. .................. 705/1 |
| 2004/0172378 | A1 | 9/2004 | Shanahan et al. |
| 2004/0193684 | A1* | 9/2004 | Ben-Yoseph ................. 709/204 |
| 2004/0215793 | A1 | 10/2004 | Ryan et al. |
| 2004/0249811 | A1 | 12/2004 | Shostack et al. |
| 2004/0260781 | A1 | 12/2004 | Shostack et al. |
| 2005/0015432 | A1 | 1/2005 | Cohen |
| 2005/0050158 | A1 | 3/2005 | Solari |
| 2005/0071741 | A1 | 3/2005 | Acharya et al. |
| 2005/0120084 | A1 | 6/2005 | Hu et al. |
| 2005/0159998 | A1 | 7/2005 | Buyukkokten et al. |
| 2005/0165785 | A1 | 7/2005 | Malkin et al. |
| 2005/0171832 | A1 | 8/2005 | Hull et al. |
| 2005/0171954 | A1 | 8/2005 | Hull et al. |
| 2005/0193054 | A1 | 9/2005 | Wilson et al. |
| 2005/0197846 | A1 | 9/2005 | Pezaris et al. |
| 2005/0198031 | A1 | 9/2005 | Pezaris et al. |
| 2005/0210409 | A1 | 9/2005 | Jou |
| 2005/0216300 | A1 | 9/2005 | Appelman et al. |
| 2005/0267766 | A1 | 12/2005 | Galbreath et al. |
| 2006/0085259 | A1 | 4/2006 | Nicholas |
| 2006/0136419 | A1 | 6/2006 | Brydon et al. |
| 2006/0184997 | A1 | 8/2006 | La Rotonda et al. |
| 2008/0133716 | A1 | 6/2008 | Rao et al. |
| 2009/0013386 | A1 | 1/2009 | Puthenkulam et al. |

FOREIGN PATENT DOCUMENTS

| | | |
|---|---|---|
| JP | 11265369 | 9/1999 |
| JP | 2002132604 | 5/2002 |
| WO | WO 0068860 | 11/2000 |
| WO | WO 2005/015470 A1 | 2/2005 |

OTHER PUBLICATIONS eBay; Star. <http://pages.ebay.com/help/basics/g-stars.html> Oct. 1, 2002 Jul. 1, 2008.*

Amazon.com, "Feedback FAQ" web page at http://www.amazon.com/exec/obidos/tg/browse/-/1161284/qid=1091110289/sr=1-1/002-2, as available via the Internet and printed on Jul. 29, 2004.

ebay, "What is eBay?" web page at http://pages.ebay.com/help/welcome/questions/about-ebay.html, as available via the Internet and printed on Jul. 29, 2004.

ebay, Bidding on Items, " How to Bid" web page at http://pages.ebay.com/help/welcome/bid.html, as available via the Internet and printed on Jul. 29, 2004.

ebay, First Time Seller, "How to Sell" web page at http://pages.ebay.com/help/welcome/sell.html, as available via the Internet and printed on Jul. 29, 2004.

Amazon.com: Help, "Selling at Amazon Marketplace" web page at http://www.amazon.com/exectobidos/tg/browse/41161234/ref=hp_hp_ls_4_2/002-283572, as available via the Internet and printed on Jul. 29, 2004.

Amazon.com: Help, "New Seller FAQ" web page at http://www.amazon.com/exec/obidos/tg/browse/41161274/002-2835726-5513622, as available via the Internet and printed on Jul. 29, 2004.

Amazon.com, "How to get a Great Feedback Score" web page at http://www.amazon.com/exec/obidos/tg/browse/-13107471/qid=1091110, as available via the Internet and printed on Jul. 29, 2004.

ebay services, "Frequently Asked Questions" web page at http://pages.ebay.com/help/basics/faq.html, as available via the Internet and printed on Jul. 29, 2004.

Amazon.com, "Friends and Favorites" web page at www.amazon.com/exec/obidos/subst/community/community-home.html, as available via the Internet and printed on Feb. 27, 2004.

Amazon.com: Help, "Wish List" web page at www.amazon.com/exec/obidos/tq/browse/-/897204/ref=ya_hp_reg_1/002-9880811-, as available via the Internet and printed on Feb. 18, 2004.

Amazon.com: Help, "Purchase Circles," web page at www.amazon.com/exec/obidos/tg/browse/-/468604/ref=cm_pc_faq/002-0759267-82, as available via the Internet and printed on Feb. 27, 2004.

"Accounts Website," web page at http://www.cs.rice.edu/-ssiver/accounts/, as available via the Internet and printed on Jul. 29, 2004.

Microsoft Corporation, "Is Friendster the 'Next Big Thing'?" web page at http://mobilemomentum.msn.com/article.aspx?aid=4, as available via the Internet and printed on Jul. 29, 2004.

"Running Notes From Revenge of the User: Lessons from Creator/User Battles," web page at http://craphound.com/danahetcon04.txt, as available via the Internet and printed on Jul. 28, 2004.

Adamic, Lada et al., "A Social Network Caught in the Web," web page at http://firstmonday.org/issues/issue8_6/adamic/, as available via the Internet and printed on Jul. 28, 2004.

Multiply, "Multiply Privacy Policy," web page at http://multiply.com/info/privacy as available via the Internet and printed on May 3, 2004.
Multiply, "Multiply Terms of Service," web page at http://multiply.com/info/tos, as available via the Internet and printed on May 3, 2004.
Multiply, "Help," web page at http://multiply.com/info/help, as available via the Internet and printed on May 3, 2004.
Multiply, "About Multiply," web page at http://multiply.com/info/about, as available via the Internet and printed on May 3, 2004.
Sullivan, Danny, "Is It Really Personalized Search?," web page at http://searchengine watch.com, as available via the Internet and printed on May 13, 2004.
Tribe.net, "Listings Directory," web page at http://www.tribe.net/tribe/servlet/template/pub,Listinqs.vm, as available via the Internet and printed on June 28, 2004.
European Examination Report, EP 05722454.5, Feb. 8, 2007, 5 pages.
International Search Report and Written Opinion, PCT/US2005/001544, Apr. 29, 2005.
PCT International Search Report and Written Opinion, PCT/US05/02240, Sep. 26, 2006, 7 pages.
"PlanetAll," From Internet Archive Wayback Machine on Nov. 1997, 19 pages, [online] [Retrieved on Mar. 17, 2004] Retrieved from the internet <URL: Internet Archive Wayback Machine: www.archive.org/www/planetall.com>.
Balabanovic, M., et al., "Content-Based, Collaborative Recommendation," Mar. 1997, pp. 66-72, vol. 40, No. 3.
Choi, J., "Netflix Prize for the best collaborative filtering algorithm," Data mining and parallelization, CGL Blog, Jul. 16, 2008, [online] [Retrieved on May 13, 2009] Retrieved from the internet <URL: http://jychoi-report-cgl.blogspot.com/2008/07/netflix-prize-for-best-collaborative.html>.
Glance, N., et al., "Knowledge Pump: Supporting the Flow and Use of Knowledge," Information Technology for Knowledge Management, 1998, 22 Pages.
Jensen, C., et al., "Finding Others Online: Reputation Systems for Social Online Spaces," Chi 2002, Apr. 2002, pp. 447-454, vol. 4, Issue 1.
Kautz, H., et al., "ReferralWeb: Combining Social Networks and Collaborative Filtering," Communications of the ACM, Mar. 1997, 4 pages, vol. 40, No. 3.
Lueg, C., "Considering Collaborative Filtering as Groupware: Experiences and Lessons Learned," Proceedings of the Second International Conference of Practical Aspects of Knowledge Management, 1998, pp. 16-1-16-6.
Resnick, P., et al., "Recommender Systems," Communications of the ACM, Mar. 1997, pp. 56-58, vol. 40, No. 3.
Rucker, J., et al., "Personalized Navigation for the Web," Communications of the ACM, Mar. 1997, pp. 73-75, vol. 40, No. 3.
"Collaborative filtering," Wikipedia, Last modified Oct. 17, 2007, [online] [Retrieved on May 13, 2009] Retrieved from the internet <URL:http://web.archive.org/web/20071020061658/http:/en.wikipedia.org/wiki/Collaborative_filtering>.
"Mufin.com: content-based recommendations," Net, Blogs and Rock'n'Roll, Oct. 8, 2008, [online] [Retrieved on May 13, 2009] Retrieved from the internet <URL: http://www.netblogsrocknroll.com/2008/10/mufin-music-fin.html>.
"Recommender system," Wikipedia, Last modified Jul. 27, 2009, [online] [Retrieved on Aug. 6, 2009] Retrieved from the internet <URL:http://en.wikipedia.org/wiki/Recommendation_system>.
Decision to Refuse a European Patent Application, European Patent Application No. EP 05722454.5, Jul. 9, 2010, 11 Pages.
NomadNet, "NomadNet News," web page at <URL:http://www.netnomad.com/> available via the Internet and printed Dec. 1, 2004, 12 pages.
Ofoto, "Ofoto Share Albums," web page at <URL:http://www.ofoto.com/ShareOverview.jsp?UV=363085663086_78428514107> as available via the Internet and printed Dec. 1, 2004, 2 pages.
Online Business Network, "Social Networking Site Guide-Ryze," web page at <URL:http://www.onlinebusinessnetworks.comlonline-social-networks-guide/ryze>, as available via the Internet and printed Dec. 1, 2004, 8 pages.

PC World, "PCWorld-ICQ Builds a Social Network," web page at <URL:http://www.pcworld.com/news/articleIO.aid.115084.OO.asp>, as available via the Internet and printed Dec. 1, 2004, 5 pages.
Petersen's Photographic, "My Photos at Photographic," web page at <URL:http://rnyphotos.photographic.com/>, as available via the Internet and printed Dec. 1, 2004, 19 pages.
PictureDot, "CactusVision WebCam from PictureDot.com—Broadcast your live webcam now, Free!" web page at <URL:http://www.picturedot.com?CactusVision_WebCam_Info.asp>, as available via the Internetand printed Dec. 1, 2004, 2 pages.
SAE International, "Why should I register to use the SAE website?" web page at <URL:http:my.sae.org/whyregister.htm>, as available via the Internet and printed Dec. 1, 2004, 1 page.
Theme your Desktop, "Free Webcam Thumbnails on your Desktop-ANY webcam.com," web page At <URL:http://themes.anywebcam.comJdesktop/desktop.html> as available via the Internet and printed Dec. 1, 2004, 3 pages.
Westlaw, "WestClip", 2004, web page at <URL:http://west.thomson.com/westlaw/westclip>, as available via the Internet and printed Jul. 28, 2004, 3 pages.
Yahoo!, "Introducing RSS Headlines," web page at <URL:http://e.my.yahoo.com/config/promo content?.module=ycontent>, as available via the Internet and printed Jun. 18, 2004, 1 page.
Yahoo!, "Yahoo! Chat," web page at <URL:http://chat.yahoo.com/>, as available via the Internet and printed Dec. 1, 2004, 1 page.
Yahoo!, "Yahoo! Help-Yahoo! GeoCities Tour," web page at <URL:http://help.yahoo.com/help/us/geo/tour/tour-01.html>, as available via the Internet and printed Dec. 1, 2004, 20 pages.
Yahoo! Groups, "Customize LostDrive-ln," web page at <URL:http://groups.yahoo.com/groups/lostdrive-in/confwiz>, as available via the Internet and printed Jun. 2, 2004, 10 pages.
Avery, C., et al., "Recommender Systems for Evaluating Computer Messages," Communications of the ACM, Mar. 1997, pp. 88-89, vol. 40, No. 3.
Konstan, J., et al., "Applying Collaborative Filinger to Usenet News," Communications of the ACM, Mar. 1997, pp. 77-87, vol. 40, No. 3.
Adamic, L., et al., "A social network caught in the Web", First Monday, 2003, pp. 1-22.
Agarwal, P et al., "Enabling Real-Time User Interests for Next Generation Activity-Oriented Social Networks", A Thesis submitted to the Indian Institute of Technology Delhi in conformity with the requirements for the degree of Bachelor of Technology, 2005, 70 pages.
Anwar, Z., et al., "Leveraging 'Social-Network' Infrastructure to Improve Peer-to-Peer Overlay Performance: Results from Orkut", 2005, 9 pages.
Baird, D., et al., "Neomillennial user experience design strategies: utilizing social networking media to support "Always on" Learning Styles," J. Educational Technology Systems, vol. 34(1) 5-32, 2005-2006.
Boyd, D., et al., "Social Network Sites: Definition, History, and Scholarship", Journal of Computer-Mediated Communication 13 (2008) 210-230.
Churchill, E., et al., "Social Networks and Social Networking", IEEE Internet Computing, Published by the IEEE Computer Society, Sep. Oct. 2005, pp. 14-19.
Cohen, T., et al., "Social Networks for Creative Collaboration", C&C'05, Apr. 12-15, 2005, ACM, pp. 252-255.
Decker, S., et al., "The Social Semantic Desktop", DERI Technical Report May 2, 2004, May 2004, 7 pages.
Eagle, N., et al., "Social Serendipity: Proximity Sensing and Cueing", MIT Media Laboratory Technical Note 580, May 2004, 18 pages.
Erickson, T., et al., "Social Translucence: Using Minimalist Visualizations of Social Activity to Support Collective Interaction", In Designing Information Spaces: The Social Navigation Approach (eds. K. Höök, D. Benyon, A Munroe), Springer-Verlag: London, 2003, pp. 17-41.
Gross, R., et al., "Information Revelation and Privacy in Online Social Networks", WPES'05, Nov. 7, 2005, ACM, pp. 71-80.
Hammond, T., et al., "Social Bookmarking Tools (I)", D-Lib Magazine, Apr. 2005, 23 pages, vol. 11, No. 4.

Heer, J., et al., "Vizster: Visualizing Online Social Networks", IEEE Symposium on Information Visualization, 2005, 8 pages.

Leonard, A., "You are who you know", published on www.salon.com, Jun. 15, 2004, 15 pages.

Lockheed-Martin Corporation "Battlefield awareness and data dissemination intelligent information dissemination server," AFRL-IF-RS-TR-1999-238, Final Technical Report, Nov. 1999, 31 pages.

Marwick, A.E., "Selling Your Self: Online Identity in the Age of a Commodified Internet", A thesis submitted in partial fulfillment of the requirements for the degree of Master of Arts University of Washington, 2005, 192 pages.

Metcalf, S., et al., "Spatial Dynamics of Social Network Evolution", Presented at the 23rd International Conference of the System Dynamics Society, Jul. 19, 2005, 13 pages.

Mori, J., et al., "Real-world Oriented Information Sharing Using Social Networks", GROUP'05, Nov. 6-9, 2005, ACM, pp. 81-84.

Nardi, B., et al., "Blogging as Social Activity, or, Would You Let 900 Million People Read Your Diary?" CSCW, Nov. 6-10, 2004, ACM, pp. 222-231, vol. 6, Issue 3.

Neumann, M., et al., "Semantic social network portal for collaborative online communities", Journal of European Industrial Training, vol. 29 No. 6, 2005 pp. 472-487.

O'Murchu, I., et al., "Online Social and Business Networking Communities", DERI—Digital Enterprise Research Institute, DERI Technical Report Aug. 11, 2004, 22 pages.

Steen, M., et al., "Development of web-centric, context-aware, adaptive mobile services requires empathy and dialogue", Freeband FRUX, 2005, pp. 1-4.

Van Eijk, R., et al., "We-centric, context-aware, adaptive mobile service bundles", Telematica Instituut, Nov. 30, 2004, 48 pages, published on Freeband.

Wenger, E., et al., "Technology for communities", CEFRIO Book Chapter v 5.2, Jan 18, 2005, pp. 1-15.

Livejournal syndicated accounts (2004), last updated Jan. 6, 2004, can be retrieved at <URL:http://www.livejournal.com/syn/>, 2 pages.

Google, Inc., "Google Answers," Google, 2004, 1 page, [online] [retrieved on Jul. 29, 2004] retrieved from the internet <URL:http://answers.google.com/answers/>.

Google, Inc., "Google Answers: Frequently Asked Questions," Google, 2003, 9 pages, [online] [retrieved on Jul. 29, 2004] retrieved from the internet <URL:http://answers.google.com/answers/faq.html>.

Yahoo! Inc., "Yahoo! Groups," Yahoo! Inc., 2004, 2 pages, [online] [retrieved on Jul. 29, 2004] retrieved from the internet <URL:http://groups.yahoo.com>.

Yahoo! Inc., "Yahoo! Help—Groups," Yahoo! Inc., 2004, 12 pages, [online] [retrieved on Jul. 29, 2004] retrieved from the internet <URL:http://help.yahoo.com/help/us/groups/groups-01.html>.

Yahoo! Inc., "Yahoo! Help—Groups Database,"Yahoo! Inc., 2004, 9 pages, [online] [retrieved on Jul. 29, 2004] retrieved from the internet <URL:http://help.yahoo.com/help/us/groups/database>.

* cited by examiner

| my friends' karma | | | | | |
|---|---|---|---|---|---|
| first name | last name | fan | trusty | cool | sexy |
| Adam | Freed | ☆ | ☺☺☺ | ▣▣▣ | ♡♡♡ |
| Adam | Smith | ☆ | ☺☺☺ | ▣▣▣ | ♡♡♡ |
| Adrian | Graham | ☆ | ☺☺☺ | ▣▣▣ | ♡♡♡ |
| Andrew | Fikes | ☆ | ☺☺☺ | ▣▣▣ | ♡♡♡ |

METHODS AND SYSTEMS FOR RATING ASSOCIATED MEMBERS IN A SOCIAL NETWORK

RELATED APPLICATIONS

This application claims the benefit of the U.S. provisional application, application No. 60/536,584, entitled "Methods and Systems for Rating Associated Members in a Social Network" filed Jan. 21, 2004, which is hereby incorporated by this reference.

FIELD OF THE INVENTION

The invention generally relates to social networks. More particularly, the invention relates to methods and systems for rating associated members in a social network.

BACKGROUND

Conventional websites such as those hosted on Friendster™, Yahoo!™, Tribe™, or other web sites, facilitate interaction between members of a network or group. These conventional websites generally do not allow members to rate or otherwise uniquely distinguish other members.

Some conventional websites provide the ability to rate other users or members of the website. For example, some websites allow a member to indicate that the member is a fan of another member. Other websites allow users to rate a person's appearance as displayed on the website. On such websites, a combined appearance score can be displayed for each displayed person.

SUMMARY

Embodiments of the present invention comprise systems and methods for rating members in a social network. One aspect of one embodiment of the present invention comprises outputting a ratings interface for rating at least one member of a social network associated with a user, wherein the rating interface provides the user with the ability to rate the member in one or more categories, receiving ratings for the member from the user, associating the ratings with the member, and connecting the ratings for the member with the user. Further features and advantages of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Introduction

Embodiments of the present invention provide methods and systems for rating associated members in a social network. There are multiple embodiments of the present invention. By way of introduction and example, one exemplary embodiment of the present invention, provides a method for allowing a user of a social network to rate another member in one or more categories. The rating for the member is associated with the user and can be used to influence the relationship between the member and the user. Additionally, an overall rating score for the member can be influenced by the ratings of associated members, and the associated members' ratings can recursively be weighted based on rating scores for other associated members.

This introduction is given to introduce the reader to the general subject matter of the application. By no means is the invention limited to such subject matter. Exemplary embodiments are described below.

System Architecture

Figure 1:
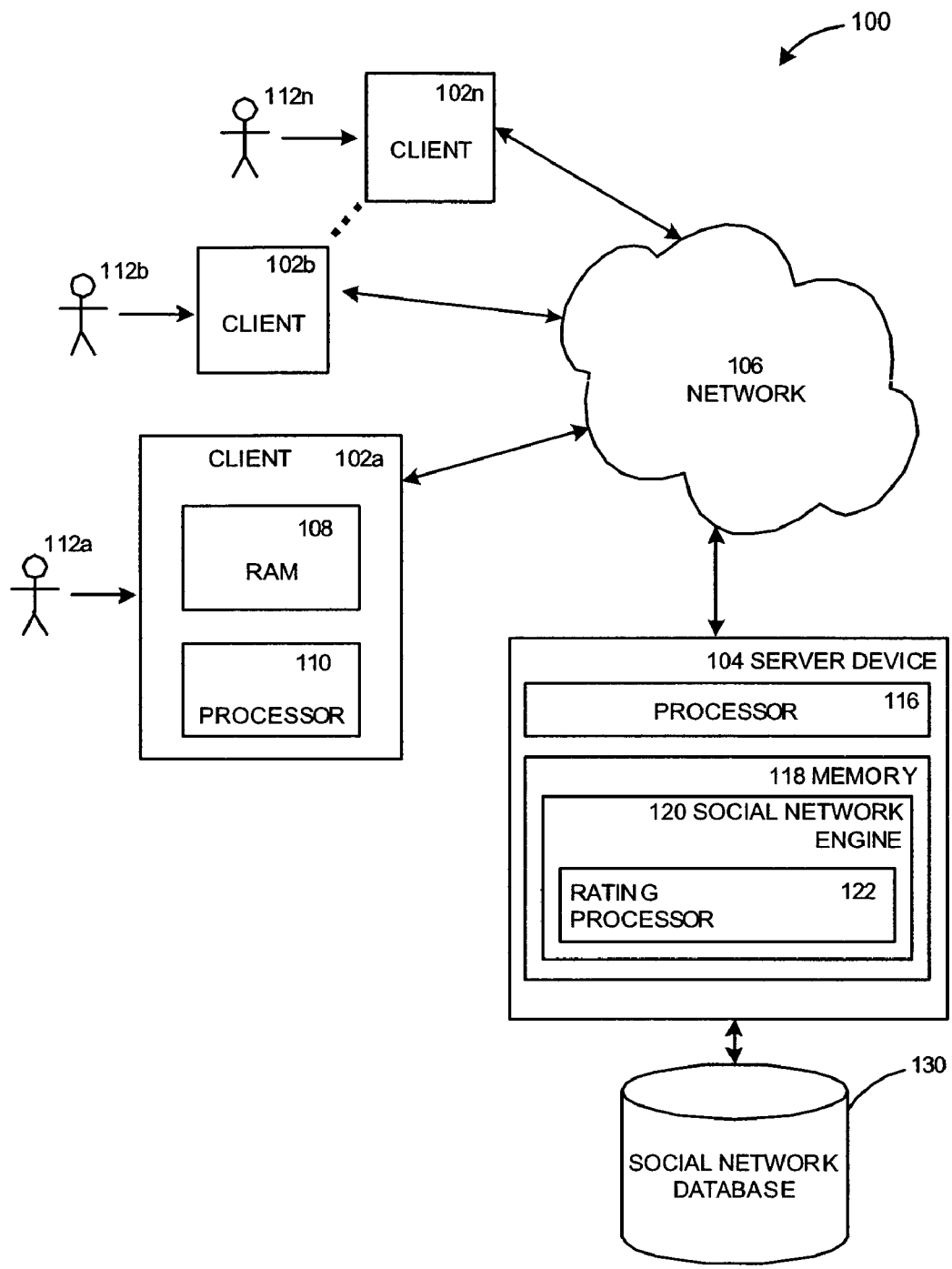
FIG. 1 illustrates a diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102a-n in communication with a server device 104 over a network 106. In one embodiment, the network 106 shown comprises the Internet. In other embodiments, other networks, such as an intranet, WAN, or LAN may be used. Moreover, methods according to the present invention may operate within a single computer.

The client devices 102a-n shown in FIG. 1 each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n can include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106.

The server device 104 shown comprises a server executing a social network engine application program, also known as a social network engine 120. The social network engine 120 allows users, such as user 112a, to interact with and participate in a social network. A social network can refer to a computer network connecting entities, such as people or organizations, by a set of social relationships, such as friendship, co-working, or information exchange. Of course, a social network can refer to a computer application or data connecting such entities by such social relationships. Examples of social networks include Orkut.com and Friendster.com.

Social networks can comprise any of a variety of suitable arrangements. An entity or member of a social network can have a profile and that profile can represent the member in the social network. The social network can facilitate interaction between member profiles and allow associations or relationships between member profiles. Associations between member profiles can be one or more of a variety of types, such as friend, co-worker, family member, business associate, common-interest association, and common-geography association. Associations can also include intermediary relationships, such as friend of a friend, and degree of separation relationships, such as three degrees away.

Associations between member profiles can be reciprocal associations. For example, a first member can invite another member to become associated with the first member and the other member can accept or reject the invitation. A member can also categorize or weigh the association with other member profiles, such as, for example, by assigning a level to the association. For example, for a friendship-type association, the member can assign a level, such as acquaintance, friend, good friend, and best friend, to the associations between the member's profile and other member profiles. In one embodiment, the social network engine 120 can determine the type of association between member profiles, including, in some embodiments, the degree of separation of the association and the corresponding weight or level of the association.

Similar to the client devices 102a-n, the server device 104 shown comprises a processor 116 coupled to a computer-readable memory 118. The server device 104 is in communication with a social network database 130. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Each profile within a social network for example, can contain entries, and each entry can comprise information associated with a profile. Examples of entries for a person profile can comprise contact information such as an email addresses, mailing address, IM name, or phone number; personal information such as relationship status, birth date, age, children, ethnicity, religion, political view, sense of humor, sexual orientation, fashion preferences, smoking habits, drinking habits, pets, hometown location, passions, sports, activities, favorite books, music, TV, or movie preferences, favorite cuisines; professional information such as skills, career, or job description; photographs of a person or other graphics associated with an entity; or any other information describing, identifying, or otherwise associated with a profile. Entries for a business profile can comprise industry information such as market sector, customer base, location, or supplier information; financial information such as net profits, net worth, number of employees, stock performance; or other types of information associated with the business profile.

The social network engine 120 can comprise a rating processor 122. The rating processor 122 can facilitate the ability of the user 112a to rate other members and can determine overall ratings for each member. The rating processor can cause the display on the client device 102a of a ratings interface. The ratings interface can display member names associated with the user 112a and allow the user 112a to rate each associated member. A member's overall ratings can be contained in and displayed with the member's profile. The member's overall rating can in part determine the appearance of a member's icon.

Server device 104 also provides access to storage elements, such as a social network storage element, in the example shown in FIG. 1, a social network database 130. The social network database 130 can be used to store profiles, or other social network components. Data storage elements may include any one or combination of methods for storing data, including without limitation, arrays, hash tables, lists, and pairs. Other similar types of data storage devices can be accessed by the server device 104. The social network engine 120 can receive data comprising the profiles and communities from the social network database 130 and can also send data comprising communities and profiles to the social network database 130 for storage. The social network database 130 may be physically attached or otherwise in communication with the social network engine 120 by way of a network or other connection.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the social networks and methods illustrated in FIGS. 2-5.

Exemplary Social Network

Figure 2:
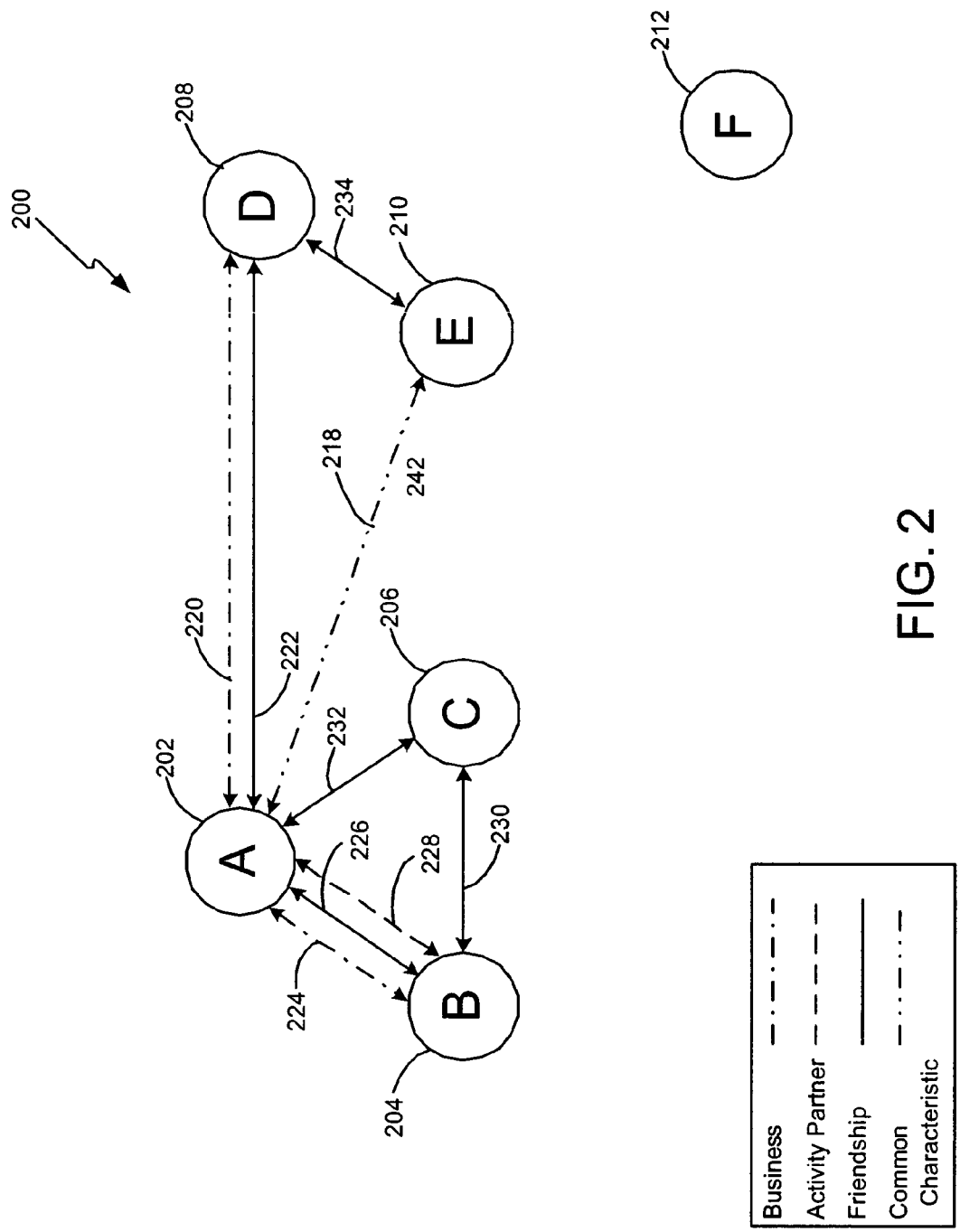
FIG. 2 illustrates one embodiment of a social network according to one embodiment of the present invention.

FIG. 2 shows a diagram of a social network 200 according to one embodiment of the present invention. According to the embodiment illustrated in FIG. 2, the social network 200 is illustrated with a graph comprising vertices 202, 204, 206, 208, 210, and 212 and edges 218, 220, 222, 224, 226, 228, 230, 232, and 234. The vertices 202, 204, 206, 208, 210, and 212 comprise profiles A, B, C, D, E, and F, respectively. Each profile can represent a member profile of a member of the social network 200. According to another embodiment, one or more of the vertices can represent a community. The methods and systems discussed below are equally applicable to an embodiment where the vertices comprise one or more communities, but for purposes of illustration, the vertices depicted in FIG. 2 represent member profiles. The exemplary network 200 shown in FIG. 2 has six members. Considerably more members can be part of the social network 200. A member can be an entity such as, for example, a person, an organization, a business, a corporation, a community, a fictitious person, or other suitable entity.

Each member profile can contain entries, and each entry can comprise information associated with a profile. For example, a person's member profile can contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A business' member profile can, for example, contain a description of the business, and information about its market sector, customer base, location, suppliers, net profits, net worth, number of employees, stock performance, contact information, and other types of suitable information associated with the business.

A member profile can also contain rating information associated with the member. For example, the member can be rated or scored by other members of the social network 200 in specific categories, such as humor, intelligence, fashion, trustworthiness, sexiness, and coolness. A member's category ratings can be contained in the member's profile. In one embodiment of the social network, a member can have fans. Fans can be other members who have indicated that they are "fans" of the member. Rating information can also include the number of fans of a member and identifiers of the fans. Rating information can also include the rate at which a member accumulated ratings or fans and how recently the member has been rated or acquired fans.

A member profile can also contain membership information associated with the member. Membership information can include information about a member's login patterns to the social network, such as the frequency that the member logs in to the social network and the member's most recent login to the social network. Membership information can also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used.

A member profile may comprise data stored in memory. The profile, in addition to comprising data about the member, can also comprise data relating to others. For example, a member profile can contain an identification of associations or virtual links with other member profiles. In one embodiment, a member's social network member profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

An association may be designated manually or automatically. For example, a member may designate associated members manually by selecting other profiles and indicating an association that can be recorded in the member's profile. According to one embodiment, associations can be established by an invitation and an acceptance of the invitation. For example, a first user can send an invitation to a second user inviting the second user to form an association with the first user. The second user can accept or reject the invitation. According to one embodiment, if the second user rejects the invitation, a one-way association can be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, can be referred to as user established associations.

Associations between profiles within a social network can be of a single type or can be multiple types and can include, for example, friendship associations, business associations, family associations, community associations, school associations, or any other suitable type of link between profiles. Associations can further be weighted to represent the strength of the association. For example, a friendship association can be weighted more than a school association. Each type of association can have various levels with different weights associated with each level. For example, a friendship association can be classified according to which of a plurality of friendship association levels it belongs to. In one embodiment, a friendship association may be assigned a level by the member from a list of levels comprising, for example: a best friend, a good friend, a regular friend, an acquaintance, and a stranger.

In FIG. 2, the edges 218, 220, 222, 224, 226, 228, 230, 232, and 234 shown comprise associations between profiles. According to the embodiment shown in FIG. 2, the social network 200 comprises a plurality of differing types of associations represented by edges 218, 220, 222, 224, 226, 228, 230, 232, and 234. The types of associations shown in FIG. 2 for illustration purposes are business associations, activity partner associations, friendship associations, community associations, and common characteristic associations. Common characteristic associations may include, for example, associations based on some characteristic, such as attending the same high school or being from the same hometown, and can indicate a lower level of significance than another type of association, such as a friendship association.

Referring to FIG. 2, edge 220 and edge 222 each comprise an association between profile A at vertex 202 and profile D at vertex 208. The edge 220 represents a business association, and the edge 222 represents a friendship association. Profile A is also associated with profile E by a common characteristic association comprising edge 218. The association between profile A and profile E may be more attenuated than the association between profile A and D, but the association can still be represented by the social network depicted in FIG. 2.

Each member represented by the profiles A, B, C, D, E, and F comprising the vertices 202, 204, 206, 208, 210, and 212, respectively, for purposes of illustration, comprises a person. Other types of members can be in social network 200. For example, communities, special interest groups, organizations, political parties, universities, and legal persons, such as corporations and business partnerships may be members of the social network 200. The associations 218, 220, 222, 224, 226, 228, 230, 232, and 234 illustrated in FIG. 2 comprise bi-directional associations. An association between two profiles may comprise a bi-directional association when both parties to the association are associated with each other. For example, in FIG. 2, profile A is associated with profile D, and profile D is also associated with profile A. In one embodiment, profiles A and D will not be bi-directionally associated with each other until both profiles consent to such an association. For example, profile A may invite profile D to be associated therewith, and the bi-directional association occurs upon profile D's acceptance of such invitation. The invitation, for example, may include sending an email or other message to profile D indicating that profile A has requested an association with profile D.

Other embodiments of the present invention may comprise directed associations or other types of associations. Directed associations can associate a first profile with a second profile while not requiring the second profile to be associated with the first profile. For example, profile A can be associated by a friendship association with profile B, and profile B can be unassociated with profile A, or profile B can be associated with profile A through a different type of association, such as a business association. Thus a display of profile A's friends can include profile B, but a display of profile B's friends would not include profile A.

According to another embodiment, a directed or single direction association can be formed when one member indicates an association with a second member but the second member does not reciprocate the association. For example, a member associated with profile A can indicate that he is a friend of a member associated with profile B. The member associated with profile B in this example can decide not to indicate that the member associated with profile A is a friend. According to one embodiment, profile B would not be displayed with profile A's friends nor would profile A be displayed with profile B's friends as the association was not reciprocated by profile B. Similarly, profile B may not be included, for example, within a listing of friends of profile A for purposes of determining degrees of separation, for example. Thus, in such an embodiment, the displaying of profile B can be controlled by the associations the member associated with profile B assents to.

Within a social network, a degree of separation can be determined for associated profiles. In one embodiment, a degree of separation between two profiles can be determined by the fewest number of edges of a certain type separating the associated profiles. In another embodiment, a type-specific degree of separation may be determined. A type-specific degree of separation comprises a degree of separation determined based on one particular type of association. For example, a profile A has a friend association degree of separation of two from profile E. The fewest number of friendship associations between profile A and profile E is two—the friendship association comprising edge 222 between profiles A and D and the friendship association comprising edge 234 between profiles D and E. Thus, for the associated profiles A and E, the degree of friendship separation, determined according to one aspect of one embodiment of the present invention, is two.

Another type-specific degree of separation can also be determined for profiles A and E. For example, a common characteristic degree of separation can be determined by determining the fewest number of common characteristic associations separating profile A and profile E. According to the embodiment depicted in FIG. 2, there is one common characteristic association, comprising edge 218, separating profiles A and E. Thus, the common characteristic association degree of separation, according to the embodiment depicted in FIG. 2, is one. The common characteristic in this example can be that profile A attended the same high school as profile E. A common characteristic association may be selected by profiles A and E to represent that they are associated in some fashion, but to not create a close association, such as with a friendship association. A type-neutral degree of association can also be determined. A type-neutral degree of association can be determined by determining the fewest number of edges connecting two vertices, regardless of type.

According to other aspects of certain embodiments of the present invention, the degree of separation may be determined by use of a weighting factor assigned to each association. For example, close friendships can be weighted higher than more distant friendships. According to certain aspects of embodiments using a weighting factor, a higher weighting factor for an association can reduce the degree of separation between profiles and lower weighting factors can increase the degree of separation. This can be accomplished, for example, by establishing an inverse relationship between each association and a corresponding weighting factor prior to summing the associations. Thus, highly weighted associations would contribute less to the resulting sum than lower weighted associations.

Process

Various methods in accordance with embodiments of the present invention may be carried out. One exemplary method according to the present invention comprises outputting a ratings interface for rating at least one member of a social network associated with a user, wherein the rating interface provides the user with the ability to rate the member in one or more categories, receiving ratings for the member from the user, associating the ratings with the member and connecting the ratings for the member with the user.

According to another embodiment the ratings for the member from the user are accessible only to the user. According to another embodiment the ratings for the member from the user influence an association between the member and the user. In another embodiment, an overall rating for the member can be calculated. In another embodiment, calculating the overall rating can comprise averaging the ratings from the user with one or more additional ratings received from one or more additional users, receiving ratings for the member from multiple users and assigning a weighting factor to each rating based at least in part on an association between each user and the member, or assigning a weighting factor for the ratings from the user based on a second overall rating associated with the user. According to another embodiment the overall rating for the member can be calculated when a predetermined number of ratings are received or when a member has a minimum number or percentage of associations with other members.

According to yet another embodiment, calculating the overall rating can comprise normalizing ratings for the member. According to another embodiment the categories comprise one or more of fan, trusty, cool, and sexy. According to another embodiment the categories are relationship-specific.

According to another embodiment the display of the ratings interface can be restricted to users within a determined degree of separation from the member. The method of claim 1, further comprising outputting one or more icons representing members, wherein a dominant rating for each icon can be graphically represented.

Figure 3:
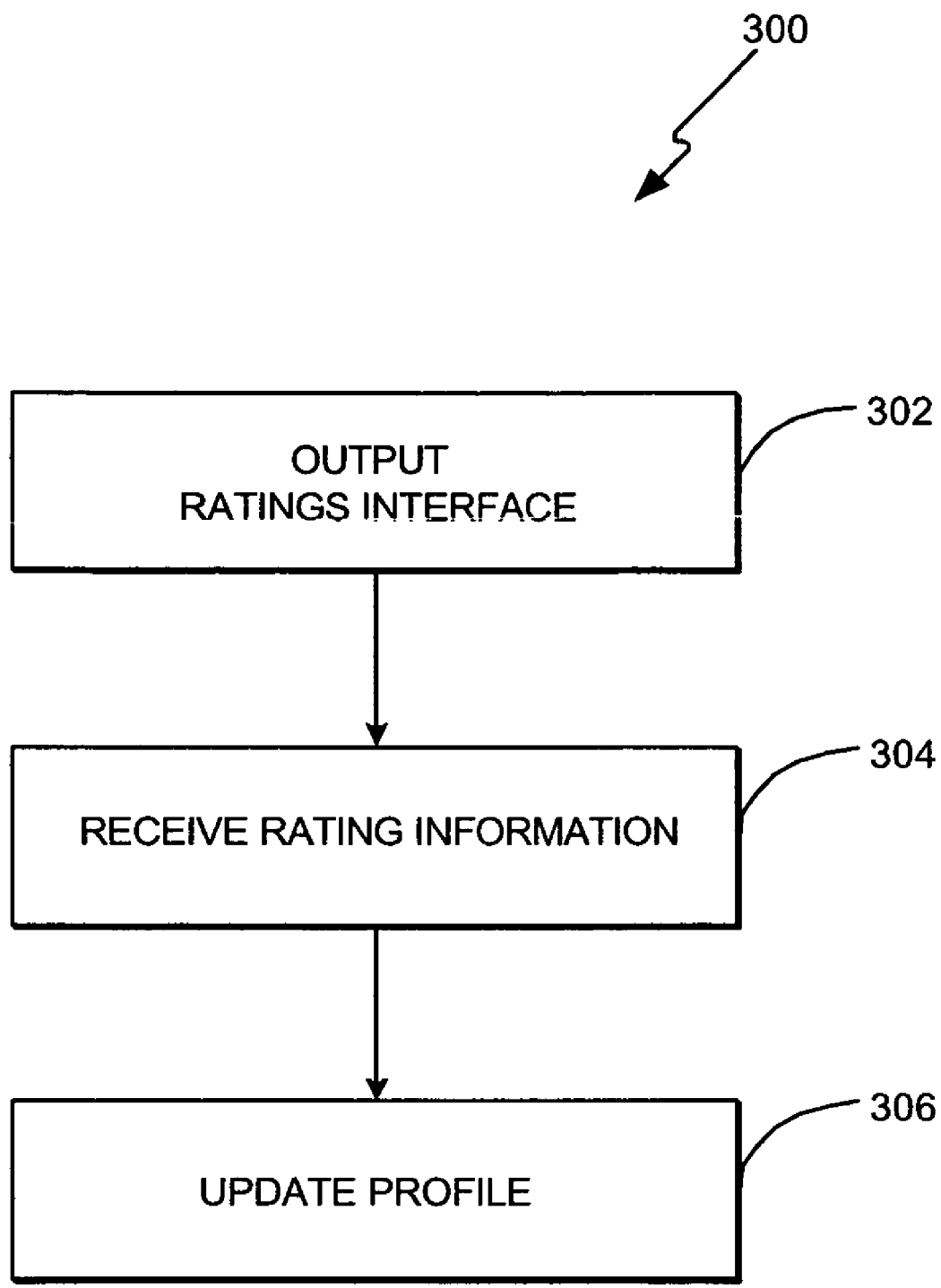
FIG. 3 illustrates a flow diagram of one embodiment of a method carried out by the present invention.

FIG. 3 illustrates an exemplary method 300 that provides a method for rating members in a social network, in accordance with one embodiment of the invention. This exemplary method is provided by way of example, as there are a variety of ways to carry out methods according to the present invention. The method 300 shown in FIG. 3 can be executed or otherwise performed by one or a combination of various systems. The method 300 is described below as carried out by the system 100 shown in FIG. 1 by way of example, and various elements of the system 100 are referenced in explaining the example method of FIG. 3.

The method illustrated in FIG. 3 begins in block 302 wherein the rating processor 122 outputs a rating interface. The rating processor 122 can output the rating interface to the client device 102a for display after receiving a rating interface request signal from the client device 102a via the network 106. The rating interface request signal can be generated by the client device 102a based on input from the user 112a. For example, the user 112a can use a mouse or other input device and click on a link to a ratings interface.

Figures 4, 5:
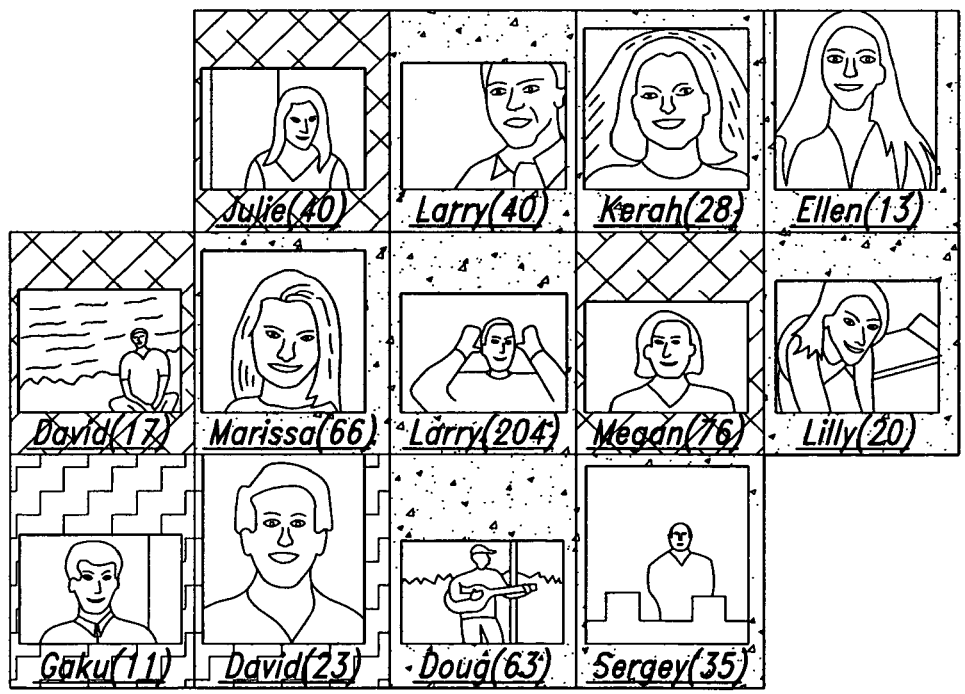
FIG. 4 illustrates an exemplary ratings interface in accordance with one embodiment of the present invention.
FIG. 5 illustrates an exemplary network grid in accordance with one embodiment of the present invention.

An example ratings interface is illustrated in FIG. 4. As shown in FIG. 4, the ratings interface can display members associated with the user 112a in a table format. The current rating (if any) that the user 112a has given to each member is displayed and the interface allows the user 112a to rate or update the rating for each member. In the embodiment shown in FIG. 4, the associated members are displayed in alphabetical order by name in rows. Each row can contain the members name and current ratings for each category. In the embodiment shown in FIG. 4, the categories are "fan", "trusty", "cool", and "sexy". Fan can indicate that the user 112a is a fan of the member. Trusty can indicate the trustworthiness of the member. Cool can indicate how trendy or popular the person is. Sexy can indicate how attractive the person is. In the embodiment shown in FIG. 4, three levels of trusty, sexy and cool are available. For example, one smiley face can indicate "trustworthy", two smiley faces can indicate "very trustworthy", and three smiley faces can indicate "super trustworthy". More categories as well as different categories are possible, such as how nice, dependable, social, responsible, or successful the member is. In another embodiment, the user 112a can create a custom category to rate members. Other manners of display for the rating interface are also possible.

According to other embodiments, rating categories can comprise negative ratings such as untrustworthy, non-sexy, or uncool. Negative ratings can comprise varying levels such as very uncool and super uncool for example. According to one embodiment, negative ratings can offset positive ratings for purposes of determining an overall rating score. For example, if a member has one very trustworthy rating (two smiley faces) and one untrustworthy rating, the member can have an overall trustworthy rating of only trustworthy (one smiley face). Thus, in this example, the ratings can be assigned integer values corresponding to the rating level and a negative rating can comprise the additive inverse of a similar level positive rating. According to one embodiment, determining the overall rating can comprise calculating the arithmetic mean of the integer values assigned to each individual score, with positive ratings contributing to the overall sum and negative ratings detracting from the sum. According to other embodiments, other suitable methods can be employed including factoring in weighting factors, determining an arithmetic median or arithmetic mode, or other suitable method for determining an overall score.

Further, the ratings interface can display members differently based on their association with the user. For example, if the user 112a has three friends A, B and C and three business associates D, E and F, A-C can be displayed in one list and D-F can be displayed in another list. Additionally, the rating categories can vary based on the type of association with the user 112a and can allow a user to enter ratings for relationship-specific categories. For example, for business associations the rating categories can relate to the trustworthiness, the dependability, and the reliability of the member.

Returning to FIG. 3, after block 302, the method 300 proceeds to block 304, wherein the rating processor 122 receives rating information. Rating information can be received from the client device 102a via the network 106. Rating information can be generated by the client device 102a in response to input from the user 112a. For example, for the rating interface illustrated in FIG. 4, the user 112a can click on or select the appropriate rating for each associated member displayed. For Adam Smith, for example, the user 112a has selected that the user 112a is a fan of Adam Smith and that Adam Smith has a trusty rating of three (super trustworthy), a cool rating of two (very cool), and a sexy rating of two (very sexy). The user 112a can input this rating information by clicking on the rating icons under each category. For example, to indicate that the user is a fan of Adam Smith's the user can click on the star icon under the fan category aligned with Adam Smith's name. To indicate that Adam Smith has a three trusty rating, the user 112a can click on the left smiley face under the trusty category aligned with Adam Smith's name. When the user 112a selects or otherwise inputs a rating for a category, a non-response http request with the rating information can be sent to the social network engine 120 by the client device 112a. Other methods of inputting rating information and different levels of ratings can be used. In one embodiment, the user 112a can only rate member with whom the user has an association. In another embodiment, the type of association and degree of separation between the user 112a and a member determine whether and the type of rating the user 112a can provide for the member. For example, if there is more than three degrees of separation between the user 112a and the member, the user 112a may not be able to rate the member.

Returning to FIG. 3, after block 304, the method 300 proceeds to block 306, where the rating information for the associated members is connected or associated with the user 112a. In one embodiment, the rating information is connected or associated by the rating processor 122 updating the profile of the user 112a to include the rating information for the associated members. In one embodiment, the user's 112a ratings of associated members can be accessed only by the user and the rated members cannot access the specific rating information from the user 112a. A user's 112a ratings of a member can be used to weight or otherwise adjust the association or other interaction with the member. For example, if the user 112a gives the member high ratings, then the association between the user 112a and the member can be stronger than another member to whom the user 112a gave a lower rating.

The rating processor 122 can also calculate an overall rating for the members whose ratings were updated by the user 112a. The overall rating can be determined by averaging all of the ratings for each category that a member has received. In one embodiment, these averages are normalized on a scale of ten. In one embodiment, the association and degree of separation of the user 112a and the member can be used to weight the user's rating of the member in the overall rating calculations. In another embodiment, the overall rating of the user 112a can be used to weight the user's rating of the member in the overall rating calculations. For example, if the user 112a has a high trusty rating, this can be used to increase the trusty rating given by the user 112a to the member. In another embodiment, the overall rating can also take into account not only how the member was rated, but also how the member's connections were rated. For example, the trusty rating could be computed recursively where a member can be considered trustworthy if the member's associations rated the member trustworthy and the effect of each associated member's rating would depend on how the associated members are rated (similar to the PageRank™ algorithm for ranking web pages). Other methods of calculating the overall rating are possible. Each member's profile can contain an overall rating. For example, an overall rating for a member can contain the total number of fans, the normalized average ratings for the categories, trusty, cool, and sexy (or other categories). This overall rating can be displayed when the member's profile is displayed.

In one embodiment, an overall rating for a member is calculated when a predetermined number of ratings, such as three or five, are received for a member. In another embodiment, an overall rating can be calculated and displayed for a member when the member has a predetermined minimum number or percentage of associations with other members. Member profiles can be stored in the social network database 130.

An icon representing a member can be marked indicating the member's ratings. For example, depending on which rating category is the highest, a different background color, pattern, image, or icon could be used on the member icon. For example, FIG. 5 illustrates an example of associations represented in a network grid where the background pattern indicates the most dominant rating. In the example shown in FIG. 5, a hashed pattern indicates that sexy is the member's dominant rating, a speckled pattern indicates that cool is the member's dominant rating, and a zigzag pattern indicates that trustworthy is the member's dominant rating. As shown in FIG. 5, for example, Julie's icon has a hashed background pattern, which indicates that her dominant rating is sexy. As another example, Larry's background pattern is speckled, which can indicate that his dominant rating is cool. According to one embodiment, background colors may be used to indicate a dominant rating. For example, blue can be used to indicate a dominant cool rating, red can indicate a dominant sexy rating, and yellow can indicate a dominant trustworthy rating. According to other embodiment, other suitable colors, patterns, or features may be used to distinguish dominant member ratings.

While the above description contains many specifics, these specifics should not be construed as limitations on the scope of the invention, but merely as exemplifications of the disclosed embodiments. Those skilled in the art will envision any other possible variations that are within the scope of the invention.

What is claimed is:

1. A computer-implemented method, comprising:
   outputting by a server device a ratings interface, the ratings interface for display by a client device and providing a user with the ability to rate at least one member of a social network associated with the user in one or more categories, the social network comprising a computer network connecting the server device and a plurality of client devices;
   receiving by the server device one or more ratings for the member provided by the user;
   associating by the server device the ratings with the member and connecting the ratings for the member with the user; and
   adjusting by the server device a level of association between the member and the user based at least in part on the ratings of the member associated with the user, wherein the level of association is distinct from the ratings and is maintained in a database.

2. The method of claim 1, wherein the ratings for the member from the user are accessible only to the user.

3. The method of claim 1, wherein the level of association comprises one or more of a best friend, a good friend, a regular friend, an acquaintance, and a stranger.

4. The method of claim 1, further comprising calculating an overall rating for the member.

5. The method of claim 4, wherein calculating the overall rating comprises averaging the ratings from the user with one or more additional ratings received from one or more additional users.

6. The method of claim 4, wherein calculating the overall rating comprises receiving ratings for the member provided by multiple users and assigning a weighting factor to each rating based at least in part on an association between each user and the member.

7. The method of claim 4, wherein calculating the overall rating comprises assigning a weighting factor for the ratings provided by the user based on a second overall rating associated with the user.

8. The method of claim 4, wherein the overall rating for the member is calculated when a predetermined number of ratings are received.

9. The method of claim 4, wherein the overall rating for the member is calculated when a member has a minimum number or percentage of associations with other members.

10. The method of claim 4, wherein calculating the overall rating comprises normalizing ratings for the member.

11. The method of claim 1, wherein the categories comprise one or more of fan, trusty, cool, and sexy.

12. The method of claim 1, wherein the categories are relationship-specific.

13. The method of claim 1, wherein the display of the ratings interface is restricted to users within a determined degree of separation from the member.

14. The method of claim 1, further comprising outputting one or more icons representing members, wherein a dominant rating for each icon is graphically represented.

15. The method of claim 1, further comprising:
   storing, by the server device, the received ratings for the member provided by the user; and
   storing, by the server device, the adjusted level of association between the member and the user.

16. A computer-readable storage medium containing machine-executable instructions comprising:
   machine-executable instructions for outputting by a server device a ratings interface, the ratings interface for display by a client device and providing a user with the ability to rate at least one member of a social network associated with the user in one or more categories, the social network comprising a computer network connecting the server device and a plurality of client devices;
   machine-executable instructions for receiving by the server device one or more ratings for the member provided by the user;

machine-executable instructions for associating by the server device the ratings with the member and connecting the ratings for the member with the user; and machine-executable instructions for adjusting by the server device a level of association between the member and the user based at least in part on the ratings of the member associated with the user, wherein the level of association is distinct from the ratings.

17. The computer-readable storage medium of claim 16, wherein the ratings for the member from the user are accessible only to the user.

18. The computer-readable storage medium of claim 16, wherein the level of association comprises one or more of a best friend, a good friend, a regular friend, an acquaintance, and a stranger.

19. The computer-readable storage medium of claim 16, further comprising machine-executable instructions for calculating an overall rating for the member.

20. The computer-readable storage medium of claim 19, wherein calculating the overall rating comprises averaging the ratings from the user with one or more additional ratings received from one or more additional users.

21. The computer-readable storage medium of claim 19, wherein calculating the overall rating comprises receiving ratings for the member provided by multiple users and assigning a weighting factor to each rating based at least in part on an association between each user and the member.

22. The computer-readable storage medium of claim 19, wherein calculating the overall rating comprises assigning a weighting factor for the ratings provided by the user based on a second overall rating associated with the user.

23. The computer-readable storage medium of claim 19, wherein the overall rating for the member is calculated when a predetermined number of ratings are received.

24. The computer-readable storage medium of claim 19, wherein the overall rating for the member is calculated when a member has a minimum number or percentage of associations with other members.

25. The computer-readable storage medium of claim 19, wherein calculating the overall rating comprises normalizing ratings for the member.

26. The computer-readable storage medium of claim 16, wherein the categories comprise one or more of fan, trusty, cool, and sexy.

27. The computer-readable storage medium of claim 16, wherein the categories are relationship-specific.

28. The computer-readable storage medium of claim 16, wherein the display of the ratings interface is restricted to users within a determined degree of separation from the member.

29. The computer-readable storage medium of claim 16, further comprising machine-executable instructions for outputting one or more icons representing members, wherein a dominant rating for each icon is graphically represented.

30. The computer-readable storage medium of claim 16, further comprising:

storing, by the server device, the received ratings for the member provided by the user; and storing, by the server device, the adjusted level of association between the member and the user.

31. A computer-implemented method, comprising:

outputting by a server device a ratings interface, the ratings interface for display by a client device and providing a user with the ability to rate at least one member of a social network associated with the user in one or more categories, the social network comprising a computer network connecting the server device and a plurality of client devices;

receiving by the server device ratings for the member from the user;

associating by the server device the ratings with the member and connecting the ratings for the member with the user; and adjusting by the server device a level of association between the member and the user based at least in part on the rating of the member associated with the user, wherein the level of association is distinct from the ratings;

calculating by the server device an overall rating for the member based on the user's rating and a weighting factor proportional to a second overall rating for the user;

normalizing by the server device the overall rating; and outputting by the server device one or more icons representing a plurality of members, wherein a dominant rating for each icon is graphically represented.

\* \* \* \* \*